(12) United States Patent
Parkes et al.

(10) Patent No.: US 10,744,721 B2
(45) Date of Patent: Aug. 18, 2020

(54) JOINING METHOD AND APPARATUS

(71) Applicant: AIRBUS OPERATIONS LIMITED, Bristol (GB)

(72) Inventors: Philip Nicholas Parkes, Bath (GB); Jonathan Meyer, Wiltshire (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 50 days.

(21) Appl. No.: 15/852,810

(22) Filed: Dec. 22, 2017

(65) Prior Publication Data
US 2018/0178459 A1    Jun. 28, 2018

(30) Foreign Application Priority Data
Dec. 23, 2016 (GB) .................................. 1622131.9

(51) Int. Cl.
*B32B 41/00* (2006.01)
*B29C 65/44* (2006.01)
(Continued)

(52) U.S. Cl.
CPC .............. *B29C 65/44* (2013.01); *B29C 65/30* (2013.01); *B29C 65/305* (2013.01);
(Continued)

(58) Field of Classification Search
CPC ..... B29C 65/44; B29C 65/30; B29C 66/9241; B29C 66/91411; B29C 66/91221;
(Continued)

(56) References Cited

U.S. PATENT DOCUMENTS 7,667,158 B2    2/2010  Dance et al.
8,182,640 B1    5/2012  Boone et al.
(Continued)

FOREIGN PATENT DOCUMENTS

DE    102009056580 A1    5/2011
DE    102014204778 A1    9/2015
(Continued)

OTHER PUBLICATIONS

F. Smith, "COMELD—An innovation in composite to metal joining", Materials Technology, 20(2), Jun. 2005, pp. 91-96.
(Continued)

*Primary Examiner* — Michael N Orlando
*Assistant Examiner* — Joshel Rivera
(74) *Attorney, Agent, or Firm* — Nixon & Vanderhye P.C.

(57) ABSTRACT

A first aspect of the invention provides a method of joining a part to a composite component, the composite component comprising fibres impregnated with a matrix material, and the part comprising a plurality of projections, the method comprising: inserting the projections into the composite component; and pre-heating the projections before they are inserted into the composite component, so that the projections are at a higher temperature than the composite component as they are inserted into the composite component. The projections locally heat the matrix material of the composite component as they are pushed into the composite component. Increased temperature during insertion is advantageous as the reduced matrix viscosity, due to the increased temperature of the matrix, results in better consolidation of the fibres around the projections and minimises the distortion of the fibres. The composite component is only heated locally where heating is required, which removes the need to heat the entire composite component.

22 Claims, 3 Drawing Sheets

(51) Int. Cl.
  *B29C 65/30* (2006.01)
  *B29C 65/00* (2006.01)
  *B29C 65/78* (2006.01)
  *B29K 705/00* (2006.01)
  *B29C 65/08* (2006.01)
  *B29C 65/72* (2006.01)
  *B29C 65/64* (2006.01)

(52) U.S. Cl.
  CPC ...... *B29C 65/7847* (2013.01); *B29C 66/1122* (2013.01); *B29C 66/3032* (2013.01); *B29C 66/474* (2013.01); *B29C 66/721* (2013.01); *B29C 66/72141* (2013.01); *B29C 66/7392* (2013.01); *B29C 66/7394* (2013.01); *B29C 66/742* (2013.01); *B29C 66/8322* (2013.01); *B29C 66/863* (2013.01); *B29C 66/91221* (2013.01); *B29C 66/91411* (2013.01); *B29C 66/9241* (2013.01); *B29C 66/92211* (2013.01); *B29C 66/961* (2013.01); *B29C 65/08* (2013.01); *B29C 65/645* (2013.01); *B29C 65/72* (2013.01); *B29C 66/30221* (2013.01); *B29C 66/7212* (2013.01); *B29K 2705/00* (2013.01)

(58) Field of Classification Search
  CPC . B29C 66/742; B29C 66/721; B29C 66/1122; B29C 66/961; B29C 66/92211; B29C 66/8322; B29C 66/72141; B29C 66/474; B29C 65/7847; B29C 65/305; B29C 66/30221; B29C 65/645; B29C 66/7212; B29C 65/72; B29C 65/08; B29C 6/863; B29C 6/7394; B29C 66/7392; B29C 65/56; B29C 65/3476; B29C 65/3468; B29C 65/34; B29C 65/02; B29K 2705/00
  See application file for complete search history.

(56) References Cited

U.S. PATENT DOCUMENTS

| | | |
|---|---|---|
| 2002/0053175 A1 | 5/2002 | McKague, Jr. et al. |
| 2003/0041948 A1 | 3/2003 | Bersuch et al. |
| 2006/0163222 A1 | 7/2006 | Dance et al. |
| 2010/0068464 A1 | 3/2010 | Meyer |
| 2010/0247869 A1 | 9/2010 | Meyer et al. |
| 2011/0240200 A1 | 10/2011 | Korya et al. |
| 2012/0045613 A1 | 2/2012 | Sanderson |
| 2012/0099923 A1 | 4/2012 | Meyer et al. |
| 2013/0183082 A1 | 7/2013 | Meyer et al. |
| 2014/0020826 A1 | 1/2014 | Meyer et al. |
| 2014/0161520 A1 | 6/2014 | Clark et al. |
| 2015/0298241 A1 | 10/2015 | Graham et al. |
| 2016/0108483 A1 | 4/2016 | Meyer et al. |

FOREIGN PATENT DOCUMENTS

| | | |
|---|---|---|
| DE | 102015206534 A1 | 10/2016 |
| GB | 2479776 A | 10/2011 |
| JP | S59201817 A | 11/1984 |
| WO | 0216784 A2 | 2/2002 |
| WO | 03020496 A1 | 3/2003 |
| WO | 2004028731 A1 | 4/2004 |
| WO | 2008110835 A1 | 9/2008 |
| WO | 2010122325 A1 | 10/2010 |
| WO | 2014080195 A1 | 5/2014 |

OTHER PUBLICATIONS

D.P. Graham et al. "A Hybrid Joining Scheme for High Strength Multi-Material Joints", In 18th International Conference on Composite Materials, Jeju Island, South Korea, Aug. 2011. 6pp.

S. Stelzer et al. "Novel Composite-Composite Joining Technology With Through Thickness Reinforcement for Enhanced Damage Tolerance", In 19th International Conference on Composite Materials, Montreal, Canada, 2013. 9pp.

F.J. Guild et al. "COMELD Joints: A Novel Technique for Bonding Composites and Metal", Rare Metal Materials and Engineering, 38:134-141, 2009.

S. Ucsnik et al. "Pin-based hybrid joining," Experimental investigation of a novel hybrid metal-composite joining technology, Composites Part A: Applied Science and Manufacturing, 41(3):369-374, 2010.

HexPly M21 Product Data, Mar. 2010, 6pp.

GB Search Report for GB1622131.9 dated Mar. 30, 2017, 4pp.

JOINING METHOD AND APPARATUS

RELATED APPLICATIONS

The present application claims priority from Great Britain Application Number 1622131.9 filed Dec. 23, 2016, the disclosure of which is hereby incorporated by reference herein in its entirety.

FIELD OF THE INVENTION

The present invention relates to a method, and associated apparatus, for joining a part to a composite component, in which projections of the part are inserted into the composite component.

BACKGROUND OF THE INVENTION

A known method of joining a part to an uncured composite layer is described in FIGS. 14-16 of WO2008/110835. A roller is rolled over an interfacing strip, and vibrated to agitate projections of the interfacing strip as they penetrate into the uncured composite layer.

SUMMARY OF THE INVENTION

A first aspect of the invention provides a method of joining a part to a composite component, the composite component comprising fibres impregnated with a matrix material, and the part comprising a plurality of projections, the method comprising: inserting the projections into the composite component; and pre-heating the projections before they are inserted into the composite component, so that the projections are at a higher temperature than the composite component as they are inserted into the composite component, wherein the part further comprises a body, the projections extend from the body, and the projections are pre-heated by applying heat to the body so that the body conducts the heat to the projections, the method further comprising: holding the body of the part with a fixture as the projections are inserted into the composite component; and releasing the body of the part from the fixture after the projections have been inserted into the composite component, wherein the projections are pre-heated by applying the heat to the body via the fixture. The projections locally heat the matrix material of the composite component as they are pushed into the composite component. This locally reduces viscosity of the matrix material which results in better consolidation around the projections and minimal distortion of the fibres. The composite component is only heated where required, removing the need to heat the entire composite component.

Typically the pre-heating causes a temperature difference between the projections and the composite component, as the projections are inserted into the composite component and/or before the projections are inserted into the composite component, which is greater than 20° C., typically greater than 30° C., and most preferably greater than 40° C. If the matrix material is a thermoplastic matrix material then the temperature difference may be greater than 100° C.

Typically the pre-heating causes a temperature of the projections, as the projections are inserted into the composite component and/or before the projections are inserted into the composite component, to exceed 45° C., typically exceed 55° C., and most preferably exceed 65° C. If the matrix material is a thermoplastic matrix material then the temperature of the projections may exceed 100° C.

Typically at least part of the composite component is at ambient temperature as the projections are inserted into the composite component. For instance at least part of the composite component may have a temperature below 40° C. as the projections are inserted into the composite component.

Typically the projections move as they are inserted into the composite component. Alternatively, the projections may remain stationary and the composite component moved as the projections are inserted into the composite component. Alternatively, both the projections and the composite component may move as the projections are inserted into the composite component.

Typically the fibres of the composite component are pushed apart by the projections as the projections are inserted into the composite component. This minimises fibre breakage and improves mechanical properties of the joint, such as load transfer.

Typically the projections are pushed into the composite component without passing through the composite component. In other words, tips of the projections become embedded in the composite component without passing fully through the composite component. Alternatively the projections may be inserted so that the tips of the projections pass fully through the composite component to the other side.

Typically the method further comprises monitoring a temperature of the part, and controlling the pre-heating of the projections based on the monitored temperature of the part. This ensures that the projections are at a high enough temperature to achieve a desired reduction in viscosity, whilst also ensuring that the temperature is low enough so as not to adversely affect the microstructure of the projections or melt the fibres.

The projections are pre-heated before they are inserted into the composite component. Optionally the projections are also heated as they are inserted into the composite component. Alternatively, the heating of the projections may be stopped before they are inserted into the composite component.

Typically the method further comprises monitoring an insertion force applied to the part as the projections are inserted into the composite component, and controlling the insertion force applied to the part based on the monitored insertion force. This ensures that the insertion force applied to the projections does not reach a level that is high enough to cause damage to the projections and/or to the composite component.

Typically the method further comprises curing the composite component after the projections have been pushed into the composite component. This curing process adheres the part to the composite component. The matrix material may be a thermoplastic material which is softened by heating and then cured by allowing it to cool. Alternatively, the matrix material may be a thermosetting matrix material, such as epoxy resin, which is cured by heating, for instance in an autoclave.

Optionally the projections are pre-heated by running an electrical current through an electrically-resistive heating element, and heating the projections with the electrically-resistive heating element. Alternatively, the projections may be pre-heated by an ultrasonic heating element. Ultrasonic vibration of the projections provides a further mechanism which improves the ease of insertion, in addition to the reduced viscosity of the matrix due to heating.

Typically the composite component is a laminar composite component. Alternatively, the composite component may be a single ply of composite material.

Typically the projections are pointed.

Typically the projections are metallic, such as Titanium. Titanium projections reduce the likelihood of galvanic corrosion.

Typically the fibres are carbon fibres, although they may be glass fibres or any other material.

A second aspect of the invention provides a device for joining a part to a composite component, wherein the composite component comprises fibres impregnated with a matrix material and the part comprises a plurality of projections, the device comprising: a fixture for holding the part; an actuator configured to push the projections into the composite component by applying an insertion force to the part via the fixture; and a heating element configured to heat the part as it is held by the fixture.

Typically, the fixture comprises a socket configured to receive the part, and a vacuum channel which is in fluid communication with the socket. Alternatively, the part may be secured to the metallic fixture by a mechanical device.

Typically, the heating element is housed within the metallic fixture. Alternatively, the heating element may be external to the metallic fixture.

Typically the heating element is an electrically resistive heating element. Alternatively the heating element may be an ultrasonic heating element or any other suitable type of heating element.

Typically the device comprises a load cell configured to measure the insertion force applied to the part by the actuator. This ensures that the insertion force applied to the projections does not reach a level that is high enough to cause damage to the projections and/or the composite component.

Optionally the fixture is a metallic fixture, and the heating element is configured to heat the metallic fixture in order to heat the part via the metallic fixture. Alternatively the heating element may be in direct contact with the part so it heats the part directly.

Typically, the device further comprises a thermally insulating gasket between the load cell and the fixture. This protects the load cell and the actuator from damage due to the heat of the fixture.

Optionally the actuator is a robotic arm.

DESCRIPTION OF THE DRAWINGS

Embodiments of the invention will now be described with reference to the accompanying drawings, in which.

DETAILED DESCRIPTION OF EMBODIMENT(S)

Figure 1:
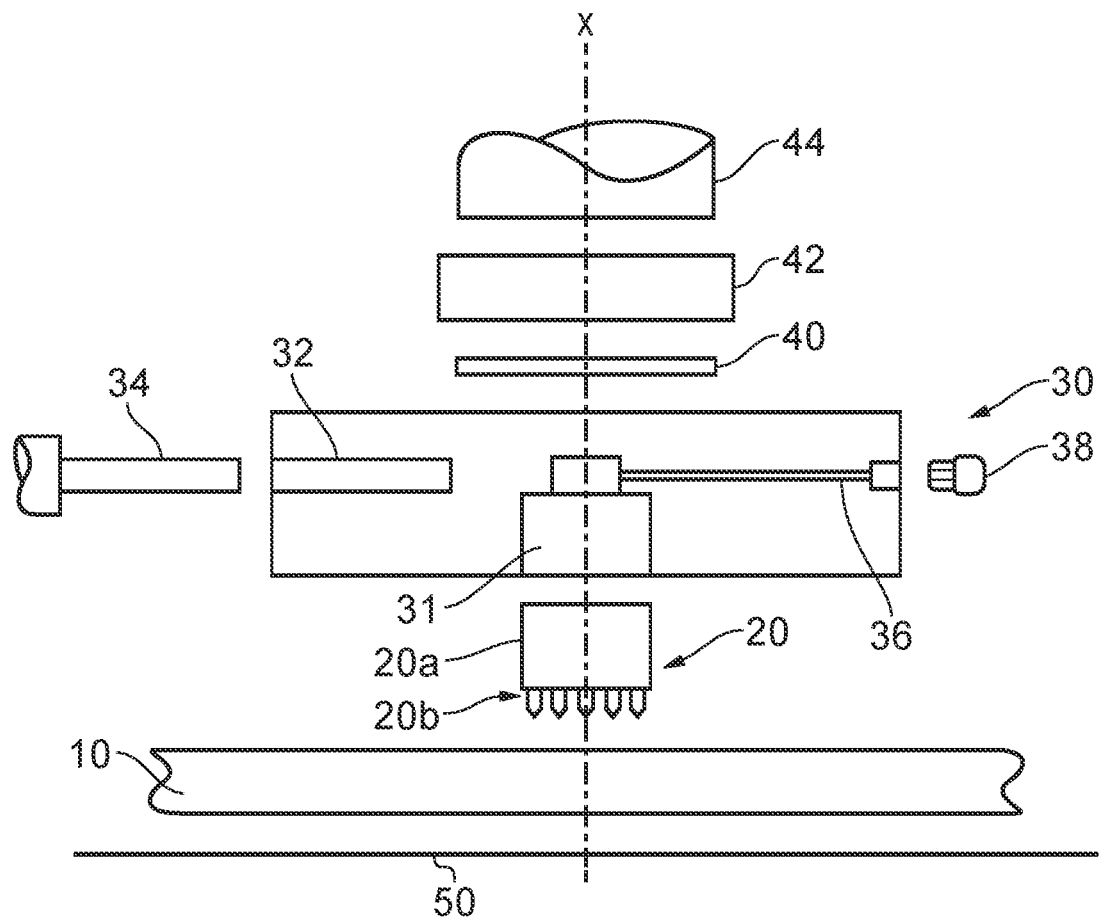
FIG. 1 is an exploded view showing a master tool, a composite component, a part and a fixture.

FIG. 1 shows an apparatus suitable for joining a composite component 10 to a metal part 20 according to a first embodiment of the present invention. The composite component 10 is a prepreg stack, made of a stack of plies of so-called "prepreg" composite material. Each ply of the prepreg stack comprises carbon fibres impregnated with a matrix material. The metal part 20 has a body 20a and pointed projections 20b extending from an underside of the body 20a. The projections 20b are typically metallic, and more typically titanium. Typically the body 20a and the projections 20b are made of the same material, although optionally they may be made of different materials (such as different titanium alloys). The projections 20b are illustrated with a thickness which decreases continuously at the tip, but other tip shapes are possible—for instance with an enlarged head as in US 2014/0020826.

Figure 5:
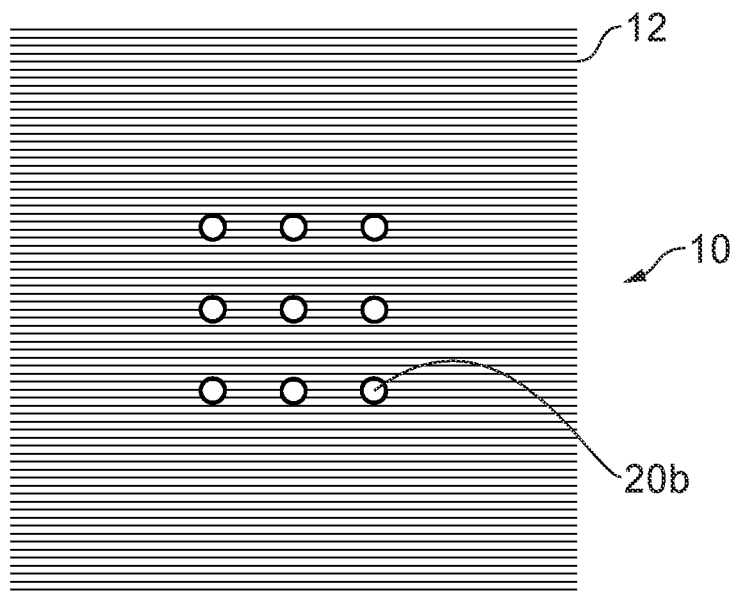
FIG. 5 is a sectional view of the top ply of the composite component after the projections have been inserted.

The composite component 10 is mounted (or laid-up) on a master tool 50. The composite component 10 may be laid-up by hand or by an automated fibre placement (AFP) machine. FIG. 5 is a sectional view of the top ply of the prepreg stack which has uni-directional carbon fibres 12 running from left to right in the view of FIG. 5. The other plies in the stack also have uni-directional carbon fibres, which may run at the same angle as the fibres 12 in the top ply or may run at another angle (typically at 90 or 45 degrees to the fibres in the top ply).

Figure 2:
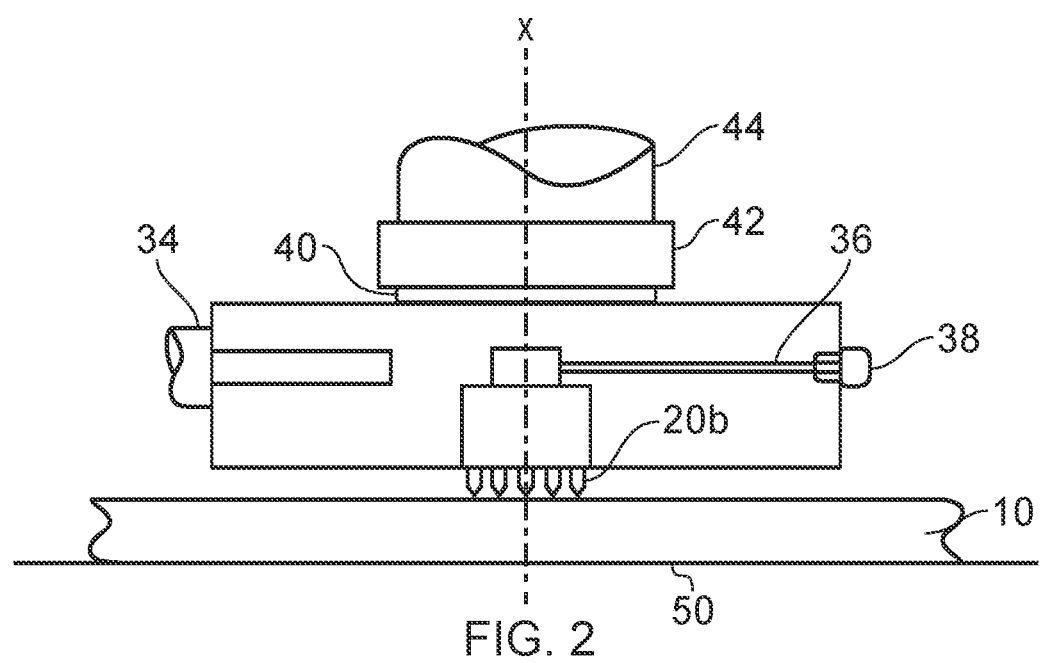
FIGS. 2-4 show a method of inserting a part into a composite component using the apparatus of FIG. 1.

The apparatus has a fixture 30 with a socket 31 sized to receive the body 20a of the metal part. The body 20a of the metal part has a complementary parallel-sided outer face which fits snugly into the socket 31 as a sliding fit when the metal part is fitted into the socket 31 as shown in FIG. 2. The fixture is typically a metallic fixture, although it may be made of any other suitable thermally conductive material. The socket 31 has a vacuum channel 36 which is in fluid communication with a vacuum pump via a fitting 38.

The fixture 30 has a hole 32 which houses an electrically resistive heating element, in this example a cartridge heater 34. During operation, the fixture 30 is heated by running an electrical current through the cartridge heater 34 housed in the fixture.

The fixture 30 is connected to a robotic arm 44, which can translate the fixture 30 up and down along an axis X. A load cell 42 is located between the robotic arm 44 and the fixture 30. The load cell 42 is configured to measure an insertion force applied to the part 20 by the robotic arm 44. A thermally insulating gasket 40 is located between the load cell 42 and the fixture 30 so as to protect the load cell 42 from the heat generated by the cartridge heater 34.

The part 20 is releasably secured within the socket 31 by activating the vacuum pump. The vacuum pump draws air out from the socket 31 via the vacuum channel 36 and the fitting 38 to create a suction force holding the part in the socket.

In an initial pre-heating step, before the projections 20b are inserted into the composite component 10, the cartridge heater 34 is activated to pre-heat the part 20 as it is held by the fixture 30 so that the part 20 is at a higher temperature than the composite component 10. The heat generated by the cartridge heater 34 is conducted from the cartridge heater 34 to the projections 20b via the metallic fixture 30 and the body 20a of the metal part.

This pre-heating step heats the projections 20b to an elevated temperature which is selected on the basis of the matrix material. In the case of a thermosetting matrix material then the elevated temperature is typically in the range of 80° C.-90° C. This is sufficiently high to cause the matrix material to become viscous, but not high enough to start the thermoset cross-linking chemical reaction of the matrix material. In the case of a thermoplastic matrix material, the elevated temperature could be much higher, and potentially as high as 350° C.

The composite component 10 is at ambient temperature (approximately 25° C.) so the temperature difference ΔT between the projections 20b and the composite component 10 is of the order of 55° C.-65° C. in the case of a thermosetting matrix material, and up to 325° C. in the case of a thermoplastic matrix material.

The temperature difference ΔT causes heat to flow from the projections 20b into the composite component 10 as the projections 20b are pushed into the composite component 10, causing local heating of the matrix material. The rest of the composite component 10 remains at ambient temperature as the projections 20b are inserted.

In an alternative embodiment the cartridge heater 34 can be replaced by an ultrasonic horn, or used in conjunction with an ultrasonic horn. Unlike the cartridge heater 34, the ultrasonic horn is in direct contact with the body 20a of the metal part. Heat is generated at the interface between the ultrasonic horn and the body 20a of the metal part since it is difficult to achieve intimate contact at the interface. This heat generated at the interface flows through the body 20a of the metal part and heats the projections 20b. The projections 20b will also vibrate ultrasonically, and this vibration of the projections 20b will also generate a certain amount of heat at the interface between the projections 20b and the composite component 10.

Optionally a thermocouple (not shown) may be provided in direct contact with the metal part 20, as close as possible to the projections 20b, to measure the temperature of the part 20. The measured temperature data from the thermocouple is then fed back to a controller (not shown) which controls the cartridge heater 34 so that the temperature of the part 20 is at a desired value.

Figure 3:
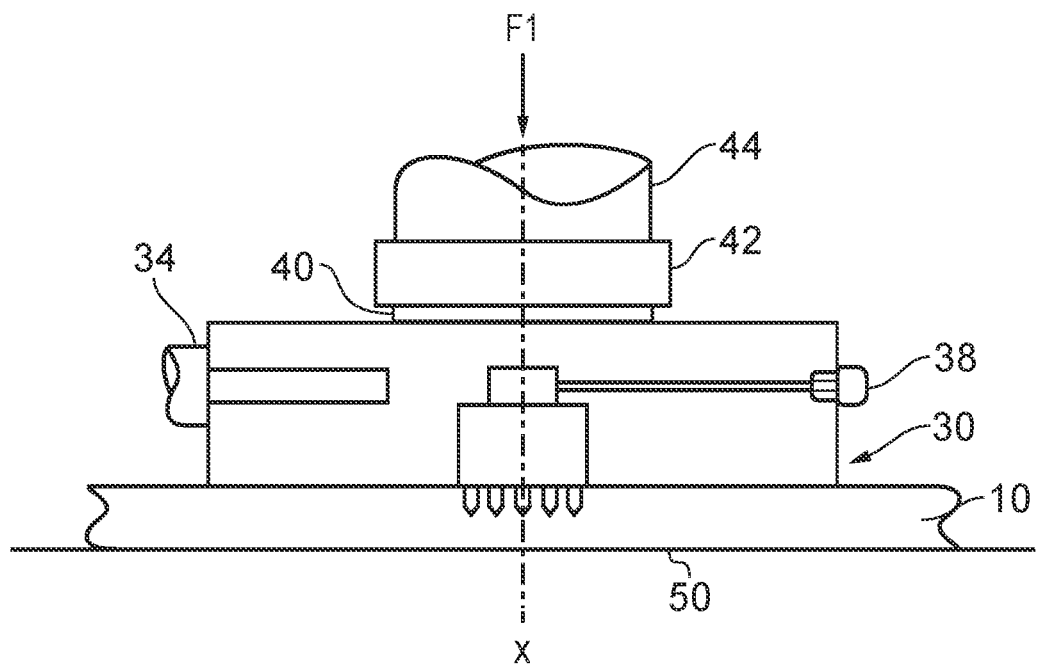

After the part has reached the desired temperature, a downward insertion force F1 (shown in FIG. 3) is applied to the fixture 30 by the robotic arm 44 along the axis X. As the insertion force F1 is applied to the fixture 30, the projections 20b pierce the composite component 10 and are inserted into the composite component 10. The insertion force F1 is monitored by the load cell 42 to generate force data which is then fed back to a controller (not shown). The controller is connected to the robotic arm 44 and is operable to control the insertion force based upon the monitored insertion force.

Figure 6:
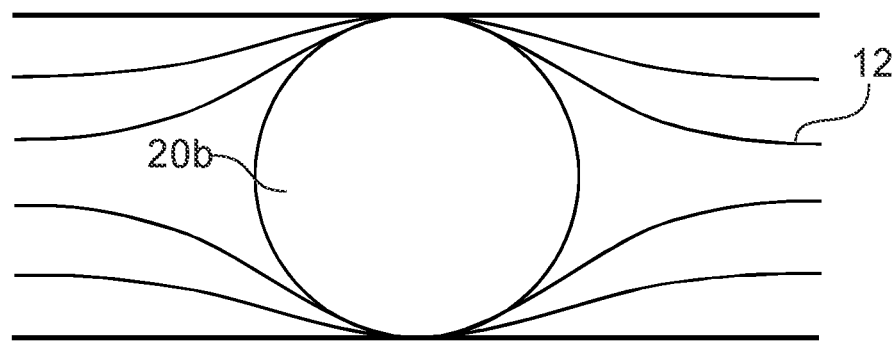
FIG. 6 is a sectional view showing fibres deflected by one of the projections.

As the composite component 10 is locally heated by the projections 20b, the viscosity of the matrix material decreases locally, which enables the fibres to move more easily out of the insertion path. As the projections 20b pass through each ply, they pierce the epoxy resin matrix material and push apart the carbon fibres 12 with minimal breakage or distortion. FIG. 6 is a schematic view of the fibres 12 passing around one of the embedded projections 20b. The minimal breakage or distortion of the fibres 12 reduces the impact of the joint on the mechanical properties of the composite component 1. The insertion force F1 is continually applied to the fixture 30 until the entire length of the projections 20b is embedded within the composite component 10.

The local heating around the projections 20b is more efficient than a surface heater such as a heater mat or hot air gun, since the high in-plane diffusivity of carbon fibre makes it difficult for thermal energy from such a surface heater to penetrate the thickness of the composite component 10.

The vacuum pump is continually activated during the insertion process so that the part 20 remains secured within the fixture 30 whilst the projections 20b are being inserted.

Figure 4:
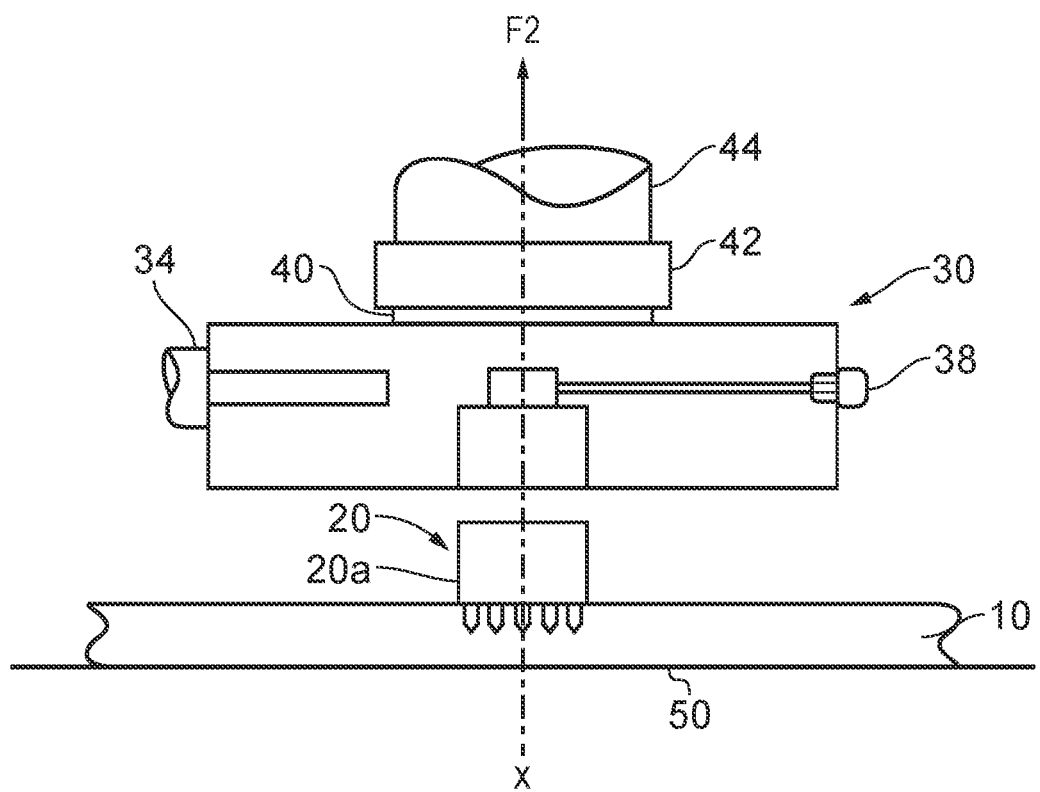

After insertion of the projections 20b into the composite, the cartridge heater 34 is deactivated so that the heating of the part 20 is stopped. The vacuum pump is also deactivated, and the vacuum channel 36 is vented to remove the suction force so that the part 20 can be removed from the socket 31. The robotic arm 44 then applies an upward release force F2 (FIG. 4) to the fixture 30 which pulls the fixture 30 away from the composite component 10 and the part 20, which is now embedded within the composite component 10.

After the projections 20b have been inserted into the composite component, the composite component is cured. This curing process adheres the metal part to the composite component. The resultant joint is conventionally known as a "hybrid joint"—a joint which employs two joining techniques, in this case an adhesive joint in combination with multiple mechanical joints with the projections 20b.

The matrix material of the composite component 10 may either be thermosetting (such as epoxy resin) or thermoplastic (such as a thermoplastic polymer). In the case of a thermoplastic matrix material, the composite component is cured by simply allowing the locally heated matrix material to cool. In the case of a thermosetting matrix material, the composite component is cured by heating the entire composite component 10—for instance in an autoclave.

Although the invention has been described above with reference to one or more preferred embodiments, it will be appreciated that various changes or modifications may be made without departing from the scope of the invention as defined in the appended claims.

The invention claimed is:

1. A method of joining a part to a composite component, the composite component comprising fibres impregnated with a matrix material, and the part comprising a plurality of projections, the method comprising:
   inserting the projections into the composite component; and
   pre-heating the projections before they are inserted into the composite component, so that the projections are at a higher temperature than the composite component as they are inserted into the composite component, wherein the part further comprises a body, the projections extend from the body, and the projections are pre-heated by applying heat to the body so that the body conducts the heat to the projections, the method further comprising:
   holding the body of the part with a fixture as the projections are inserted into the composite component;
   and releasing the body of the part from the fixture after the projections have been inserted into the composite component.

2. The method of claim 1 wherein the pre-heating causes a temperature difference between the projections and the composite component which is greater than 20° C.

3. The method of claim 1, wherein the fibres of the composite component are pushed apart by the projections as the projections are inserted into the composite component.

4. The method of claim 1 further comprising monitoring a temperature of the part, and controlling the pre-heating of the projections based on the monitored temperature of the part.

5. The method of claim 1, the method further comprising heating the projections as the projections are inserted into the composite component.

6. The method of claim 1 further comprising monitoring an insertion force applied to the part as the projections are inserted into the composite component, and controlling the insertion force applied to the part based on the monitored insertion force.

7. The method of claim 1 further comprising curing the composite component after the projections have been inserted into the composite component, thereby adhering the part to the composite component.

8. The method of claim 1 wherein the projections are pre-heated by running an electrical current through an electrically-resistive heating element, and applying the heat to the body with the electrically-resistive heating element.

9. The method of claim 1 wherein the matrix material is a thermoplastic matrix material.

10. The method of claim 1 wherein the projections are metallic.

11. A device for joining a part to a composite component, wherein the composite component comprises fibres impregnated with a matrix material and the part comprises a body and a plurality of projections extending from the body, the device comprising: a fixture for holding the body of the part; an actuator configured to push the projections into the composite component by applying an insertion force to the part via the fixture; and a heating element configured to heat the body as it is held by the fixture.

12. A device for joining a part to a composite component, wherein the composite component comprises fibres impregnated with a matrix material and the part comprises a plurality of projections, the device comprising: a fixture for holding the part; an actuator configured to push the projections into the composite component by applying an insertion force to the part via the fixture; and a heating element configured to heat the part as it is held by the fixture, wherein the fixture comprises a socket configured to receive the part, and a vacuum channel which is in fluid communication with the socket.

13. The device of claim 11 wherein the heating element is housed within the fixture.

14. The device of claim 11 wherein the heating element is an electrically resistive heating element.

15. The device of claim 11 further comprising a load cell configured to measure the insertion force applied to the part by the actuator.

16. The device of claim 15 further comprising a thermally insulating gasket between the load cell and the fixture.

17. The device of claim 11 wherein the fixture is a metallic fixture, and the heating element is configured to heat the metallic fixture in order to heat the part via the metallic fixture.

18. The device of claim 11 wherein the fixture is configured to releasably hold the part.

19. The device of claim 11 wherein the fixture has a hole which houses the heating element.

20. The device of claim 11 wherein the actuator is a robotic arm.

21. The method of claim 1 wherein the projections are pre-heated by applying the heat to the body via the fixture.

22. The device of claim 11 wherein the heating element is configured to heat the projections by applying the heat to the body via the fixture.

* * * * *